United States Patent
Le Rudulier et al.

(10) Patent No.: US 10,360,400 B2
(45) Date of Patent: Jul. 23, 2019

(54) CONTEXT-AWARE DELEGATION RISK SYSTEM

(71) Applicant: QUEST SOFTWARE INC., Aliso Viejo, CA (US)

(72) Inventors: Olivier Le Rudulier, Halifax (CA); Michel Albert Brisebois, Renfrew (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 532 days.

(21) Appl. No.: 15/017,107

(22) Filed: Feb. 5, 2016

(65) Prior Publication Data

US 2017/0228558 A1   Aug. 10, 2017

(51) Int. Cl.
*G06F 21/62* (2013.01)
*G06F 17/30* (2006.01)
*H04L 29/06* (2006.01)
*G06F 16/182* (2019.01)
*G06F 21/57* (2013.01)
*G06Q 10/00* (2012.01)

(52) U.S. Cl.
CPC ........ *G06F 21/6245* (2013.01); *G06F 16/182* (2019.01); *G06F 21/57* (2013.01); *G06Q 10/00* (2013.01); *H04L 63/105* (2013.01); *G06F 2221/034* (2013.01)

(58) Field of Classification Search
CPC .......... G06F 21/6245; G06F 17/30194; G06F 21/121; G06F 21/105; G06F 21/62; G06F 17/30; H04L 63/102; H04L 29/06
USPC .................................. 726/28, 29, 4; 713/156
See application file for complete search history.

(56) References Cited

U.S. PATENT DOCUMENTS

2013/0298192 A1 * 11/2013 Kumar .................... G06F 21/52
                                                                              726/3
2016/0246966 A1 * 8/2016 Batrouni ................. G06F 21/60

* cited by examiner

*Primary Examiner* — Ashokkumar B Patel
*Assistant Examiner* — Quazi Farooqui
(74) *Attorney, Agent, or Firm* — Maschoff Brennan (57) ABSTRACT

A risk analysis system of associated with an enterprise system for determining delegation risks associated with assigning candidate individuals to perform various tasks. In some cases, the delegation risk analysis system may generate individual delegation risk scores to each candidate individual to assist in the delegation of tasks throughout an organization. In some examples, the delegation risk analysis system may determine the delegation risk scores based on context risk factors associated with the task and the individual and intrinsic delegation risk factors associated with the enterprise system.

20 Claims, 5 Drawing Sheets

CONTEXT-AWARE DELEGATION RISK SYSTEM

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Delegation of access (e.g., access privileges) to documents or folders based on role or organizational chart is a feature in many information system. In some cases, the access to a particular document or folder is manually assigned by a system administer to individuals at a company or to individual based on role and job (e.g., to each manager in a particular department). In some cases, the type of access to a document or folder may range from full read/write access to limited read only access. The type of access is typically delegated to a particular individual or a particular group of individuals based on organization structure or job description regardless of the individual in the job or the role in an organization.

SUMMARY

In one implementation, a delegation risk analysis system to provide context-aware delegation and/or access decisions associated with individuals and various content items (e.g., documents, folders, etc.) of a company's data store in real-time or near real time. For example, some systems create rules to allow individuals with particular job titles or places within an organizational chart to access particular content items. However, each individual with a particular job title or place within an organizational chart may have different risks associated with exposing confidential information. For instance, a first individual and second individual may both have the same position (e.g., same role or same level in a hierarchical organization) at a company. However, the first individual may have a history of electronically transmitting or emailing confidential documents to an incorrect address, while the second individual does not, inadvertently creating a high delegation risk for the first individual when assigning the first individual a task associated with confidential documents as compared to assigning the task to a second individual. Thus, in the present example, the delegation risk analysis system may provide a delegation risk score for both the first individual and the second individual to an administrator or manager charged with assigning the task to a team member. In this example, the administer or manager may select the second individual over the first individual based on the higher risk associated with the carelessness of the first individuals email history, thereby reducing the delegation risk associated with the particular task.

In some implementations, the delegation risk analysis system may consider context delegation risk factors (e.g., risk factors associated with the individual, the task, and/or the content items associated with the task) together with intrinsic delegation risk factors (e.g., risk factors common to various enterprise systems) to generate the delegation risk score for each candidate individual that may be assigned a particular task. In some cases, a delegation engine may be incorporated into or associated with the delegation risk analysis system or that may assign task without user input based on the delegation risk scores generated by the delegation risk analysis system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

This disclosure includes techniques and implementations to generate delegation risk scores in real-time or near real-time to assist with task assignment and reducing security or leakage of confidential or proprietary information either outside the company or organization to individual's within the company or organization not authorized to view the data. For example, a delegation risk analysis system may be provided to perform context-aware delegation and/or task assignment decisions associated with individuals and various content items (e.g., documents, folders, etc.) associated with the tasks in real-time or near real time.

In some implementations, the delegation risk analysis system may include a delegation score system to evaluate or score a delegation risk associated with assigning a particular individual a particular task based at least in part on information known about the particular individual (e.g., history, physical location, other tasks, accesses or authorization levels, etc.), information known about the particular task (e.g., documents related to the task, content classification or sensitivity level, time factors, duration, among others), and general information (e.g., a time of year, threat condition, terrorism risk level. As used herein a delegation risk is a security risk that confidential or sensitive content may be leaked or exposed to other individuals within the company, the general public, or other entities whom are not authorized to view the content.

In some examples, the delegation score system may determine the delegation risk score based at least in part on a context risk factors (factors specific to the individual and the task being scored, such as the individual's personal risk profile or trust profile) and intrinsic risk factors (factors common to enterprise systems, such as access rules and permissions and historical delegation information). The delegation score system may evaluate each factor based on relevance or a relevancy score, select or weight various factors based on the relevance or relevancy score and integrate each of the weighted factor scores selected as relevant (e.g., above a relevancy threshold) to generate a delegation risk score representative of the delegation risk associated with assigning the individual to the particular task.

For example, a first individual and second individual may both have the same security clearance or the same access permissions or authorization. However, the first individual may have a history of electronically transmitting or emailing confidential documents to an incorrect address, while the second does not. Even if accidental the first individual has a higher delegation risk than the second individual even though both may have the same security clearance. Thus, in the present example, the delegation risk analysis system may assign a higher delegation risk score to the first individual than the second individual based on the historical email data or increased risk profile (or reduced trust profile) for the first individual. In this example, an administrator or manager charged with assigning the task to a team member may select the second individual based on the lower delegation risk score.

In another example, if the same first individual and second individual were candidates to be assigned a second task in addition to the first task, the delegation risk scores for each individual may vary from the delegation risk scores associated with the first task. For example, in the current situation, the second individual has already been assigned to the first task. Thus, the second individual may have a higher delegation risk as each new task assigned to an individual may increase the likelihood of a mistake or an issue with other tasks as well as the likelihood that the task may not be completed on time. So in the current example, the second individual delegation risk score associated with the second task may be higher than the first individual who was not assigned to the first task even though the first individual may have a history of carelessness. Thus, the first user may be assigned the second task.

In yet another example, the first individual and the second individual may be candidates for a third task. The third task may include jointly working on the task assigned to a group of individuals in New York. In this example, the first individual may also be located in New York, while the second individual may be located in California. In this case, the delegation score system may generate a higher delegation risk for the second individual than the first individual as the likelihood of a content item being exposed to unauthorized personal may increase when the individuals assigned to the task are not in the same time-zone or not located physically in the same area. Thus, in this example, the administrator may also assign the third task to the first individual.

In other examples, factors such as data classification or security level, location of the data, data business context or subject matter, the personal risk profile of each individual, a personal trust profile of each individual, historical data associated with past assignments, directory, email, or other service system data, human resource data, historical delegation tracking data, relationships between multiple individuals assigned to the task or related tasks, individual's expertise or knowledge level related to the context or content of the task, physical location of data or the individual, physical location of data or the individual assigned to the task or related tasks, time-zones of the individual being evaluated or other individual assigned to the task or related tasks, time of year, threat condition at various governmental levels, system attributes or settings (e.g., email or active directory access rules and permissions, system sharing settings, etc.).

Figure 1:
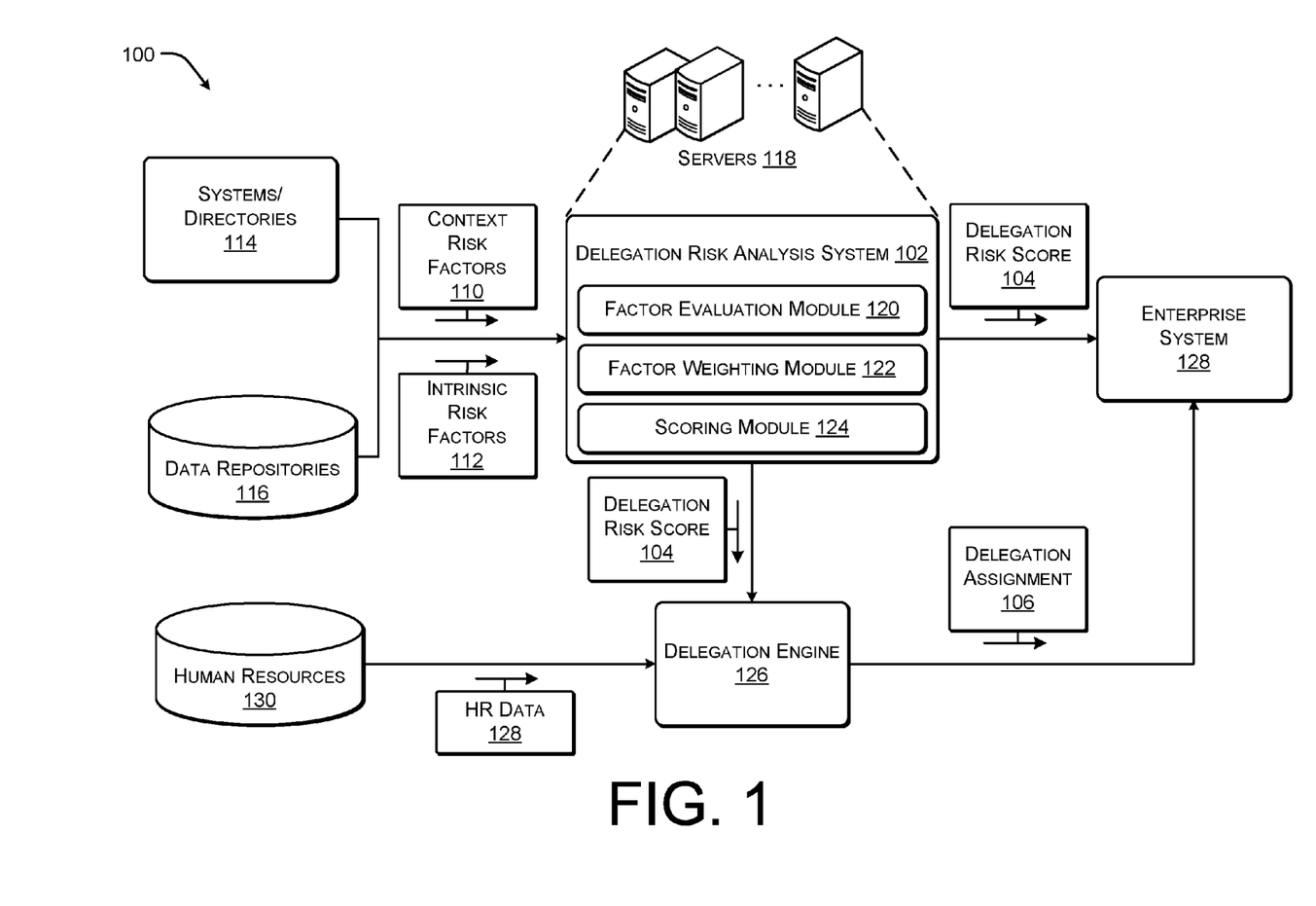
FIG. 1 illustrates an example delegation risk analysis system including a delegation score system according to some implementations.

FIG. 1 illustrates an example system 100 including a delegation risk analysis system 102 according to some implementations. As discussed above, the system 100 may in real-time or near real-time generate delegation risk scores 104 associated with assign a particular individual a particular task and/or generate delegation assignments 106 to assign a individual to the particular task based at least in part on the delegation risk scores 104. In the illustrated example, the system 100 includes the delegation risk analysis system 102 to generate the delegation scores 104 and a delegation engine system 108 to generate the delegation assignments 106 based on the delegation risk scores 104. For illustrative purposes, in the above description, a high delegation risk score represent a high delegation risk. However, in other cases, a low delegation risk score may represent a high delegation risk.

The delegation risk analysis system 102 may include various computing resources, generally illustrated as sever 118. For example, the computing resources may include a CPU-type processing unit, a GPU-type processing unit, a Field-programmable Gate Array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip Systems (SOCs), Complex Programmable Logic Devices (CPLDs), etc.

The delegation risk analysis system 102 also includes one or more modules for determining the delegation risk score 104 for each task to individual pairing. For instance, in the illustrated example, the delegation risk analysis system 102 includes a factor evaluation module 120, a factor weighting module 122, and a scoring module 124. In some cases, the factor evaluation module 120 may analyze each factor 110 or 112 received and determines a percentage or ratio related to the specific factors 110 or 112 relevancy to the given task. The factor weighting module 122 may then apply different weights to each factor 110 or 112 based at least in part on the relevancy percentage or score determined by the factor evaluation module 120. The score module 124 may integrate or combine each of the individual weighted factor scores to generate the delegation risk score 104 for the particular individual given the particular task.

In some examples, the delegation risk analysis system 102 may receive context risk factors 110 as well as intrinsic risk factors 112 from various system directories 114 and/or various data repositories 116. In some cases, the context risk factors 110 may include factors specific to the individual and/or the task being scored. For example, the context risk factors 110 may include individual's risk profile or trust profile, data classification or security level, location of the data, data business context or subject matter, historical data associated with past assignments, directory, email, or other service system data, human resource data, historical delegation tracking data, relationships between multiple individuals assigned to the task or related tasks, individual's expertise or knowledge level related to the context or content of the task, physical location of data or the individual, physical location of data or the individual assigned to the task or related tasks, time-zones of the individual being evaluated or other individual assigned to the task or related tasks, time of year, threat condition at various governmental levels, among others. In some cases, the intrinsic risk factors 112 may include factors common to enterprise systems. For example, the intrinsic risk factors 110 may include system attributes or settings, access rules and permissions, system sharing capabilities, historical delegation information, among others.

In some implementations, the systems/directories 114 may include one or more programs or applications that are accessible to the individual or associated with the task being scores. For example, the system/directories 114 may include any number of email systems/services, communication systems/services, directories (such as active directories), etc. In some cases, the systems/directories 14 may include various computing resources such as, for example, a CPU-type processing unit, a GPU-type processing unit, a Field-programmable Gate Array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip Systems (SOCs), Complex Programmable Logic Devices (CPLDs), etc. The system/directories 114 may also include various types of storage components, such as volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium.

In one example, the delegation risk analysis system 102 may generate one or more delegation risk scores 104 associated with a particular task. For example, a first individual and second individual may both have the same security clearance and/or the same access permissions or authorization. Both the first and second individuals may also be candidates for performing the functions associated with the particular task. The delegation risk analysis system 102 may receive context risk factors 112 and intrinsic risk factors 114 associated with both the first and second individual from the systems/directories 114 and the data repositories 116.

The factors 110 and 112 associated with the first individual may include a history of electronically transmitting or emailing confidential documents to an incorrect address and the factors 110 and 112 associated with the second individual may include a physical location outside of the United States. The functions associated with the task may also require a large number of emails or amount of data be electronically transmitted. In this case, the factor evaluation module 120 may rank the factors 110 and 112 associated with electronic communication higher than say the factors associated with geographic or physical location. Likewise, the factor weighing module 122 may increase the weight or multiple the f factors 110 and 112 associated with the electronic communication higher than other of the factors 110 and 112. For example, the factor weighting module 122 may multiple a factor score associated with the electronic communication factors by a value such as 1.1, 1.2, 1.3 etc. to increase the importance of the factors 110 and 112 associated with the electronic communication. Similarly, the factor weighting module 122 may multiple factors 110 and 112 that the factor evaluation module 120 classifies as less important, such as the physical location factors in this example, by a value such as 0.9, 0.8, 0.7 etc. to reduce the factors 110 and 112 importance.

Thus, in this example, the factor score module 124 may generate a score that combines the factor scores that includes a higher delegation risk score 104 for the first individual than the second individual even though the second individual may be in a more remote or risky location. However, if the task involved physically mailing or transporting classified or confidential documents the second individual may have a higher delegation risk score 104 than the first individual. For instance, the factor evaluation module 120 may have ranked the importance of physical location factors 110 an 112 higher than electronic communication factors 110 and 112 and the factor weighting module 122 may have increase the value of the physical location factors 110 and 112 and reduce the value of the electronic communication factors 110 and 112.

Once the delegation risk score 104 for both the first and second individuals are determined, the delegation risk analysis system 102 may send the scores 104 to a delegation engine 126. The delegation engine 126 may be configured to generate a delegation assignment 106 to select either the first individual or the second individual to assign to the task based on the scores 104. In some cases, the delegation engine 126 may make multiple assignments over a large group of candidates based on continuously updating delegation scores 104 as each task is assigned. For example, as each task is assigned to an individual, the delegation scores 104 for that individual on other tasks may be increased or the individual has a higher delegation risk the more tasks that are assigned.

In some cases, the delegation engine 126 may generate delegation policy or rules based at least in part on the delegation risk scores 104 received from the delegation risk analysis system 102. For example, the delegation engine 126 may create delegation policies that allow an individual to access some of the content associated with a task while preventing the same individual from accessing other content associated with the same task. In other cases, the delegation policy may include rules, such as whom can be assigned what task, minimum or maximum delegation risk scores 104 for assignment, how many tasks each individual can be assigned, among others.

In some cases, the delegation engine 126 may also receive human resource data 128 from a human resource database 130 to assist with generating the delegation assignments 106. For example, the human resource data 128 may include data such as job description, security clearance, etc. that may be useful in making a delegation assignment 106.

Once the delegation assignment 106 is generated, the assignment 106 may be sent to one or more enterprise system 132 to allow the assigned individual to access the content associated with the task. In some examples, the delegation risk analysis system 102 may send the delegation risk scores 104 directly to the enterprise systems 132. For example, in some cases, a manager or system administer may determine the delegation assignment 106 without the assistance of the delegation engine 126. Thus, in these cases, delegation risk analysis system 102 may send the delegation risk scores 104 directly to the enterprise systems 132.

Figure 2:
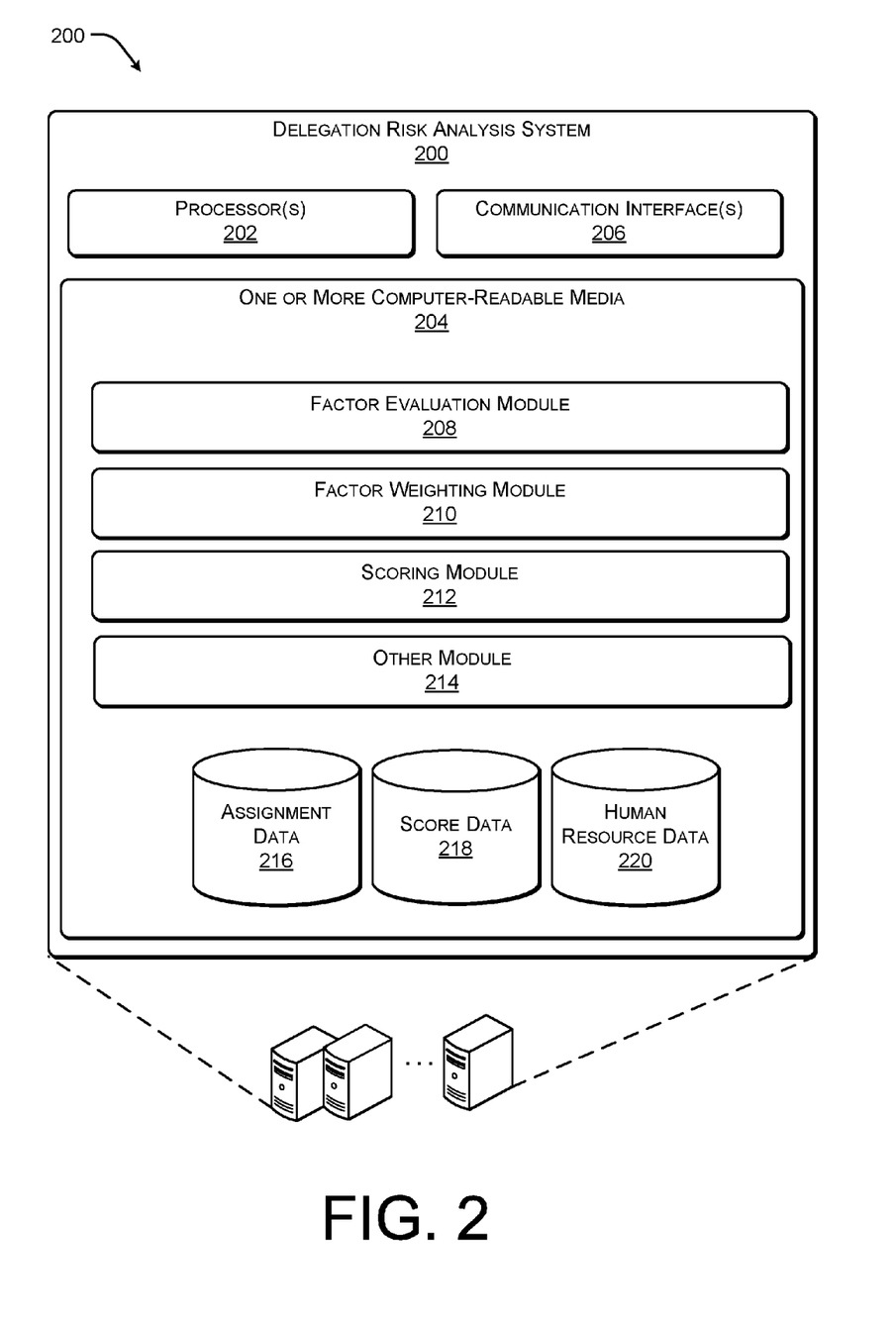
FIG. 2 illustrates example components of one or more servers associated with the management system according to some implementations.

FIG. 2 illustrates an example architecture of one or more servers associated with the delegation risk analysis system 200 according to some implementations. The servers, which host the delegation risk analysis system 200 collectively comprise processing resources, as represented by processors 202, and computer-readable storage media 304. The computer-readable storage media 204 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The servers may also include one or more communication interfaces 206, which may support both wired and wireless connection to various networks, such as cellular networks, radio (e.g., radio-frequency identification RFID), WiFi networks, short-range or near-field networks (e.g., Bluetooth®), infrared signals, local area networks, wide area networks, the Internet, and so forth. For example, the communication interfaces 206 may allow the delegation risk analysis system 200 to receive context risk factors and the intrinsic risk factors from various systems, services, data stores, or directories and to send delegation risk scores to a delegation engine or enterprise system.

Several modules such as instruction, data stores, and so forth may be stored within the computer-readable media 204 and configured to execute on the processors 202. For example, a factor evaluation module 208, a factor weighting module 310, a scoring module 212, as well as other modules 214. In some implementations, the computer-readable media 204 may store data, such as assignment data 216, score data 218, and human resource data 220.

The factor evaluation module 208 may rank the context risk factors and the intrinsic risk factors associated with task based on relevancy. The factor weighing module 210 may increase the weight of some of the factors and decrease the weight of other factors based at least in part on the relevancy or relevancy score. The factor score module 212 may generate a score that combines the factor scores to generate a delegation risk score for an individual for a particular task, as described above.

The assignment data 216 may include data related to other assignments and/or tasks currently associated with an enterprise system or organization. The score data 218 may include rules or policies for generating scores based on the various context risk factors and the intrinsic risk factors received by the communication interfaces 206. The human resource data 220 may include information related to job, location, security clearance, permissions, etc. of one or more individuals being scored based on delegation risk. In some cases, the factor evaluation module 208, the factor weighting module 310, and/or the scoring module 212 may also utilize the assignment data 216, the score data 218, and/or the human resource data 220 to assist with evaluating and weighting factors as well as generating the delegation risk score.

Figure 3:
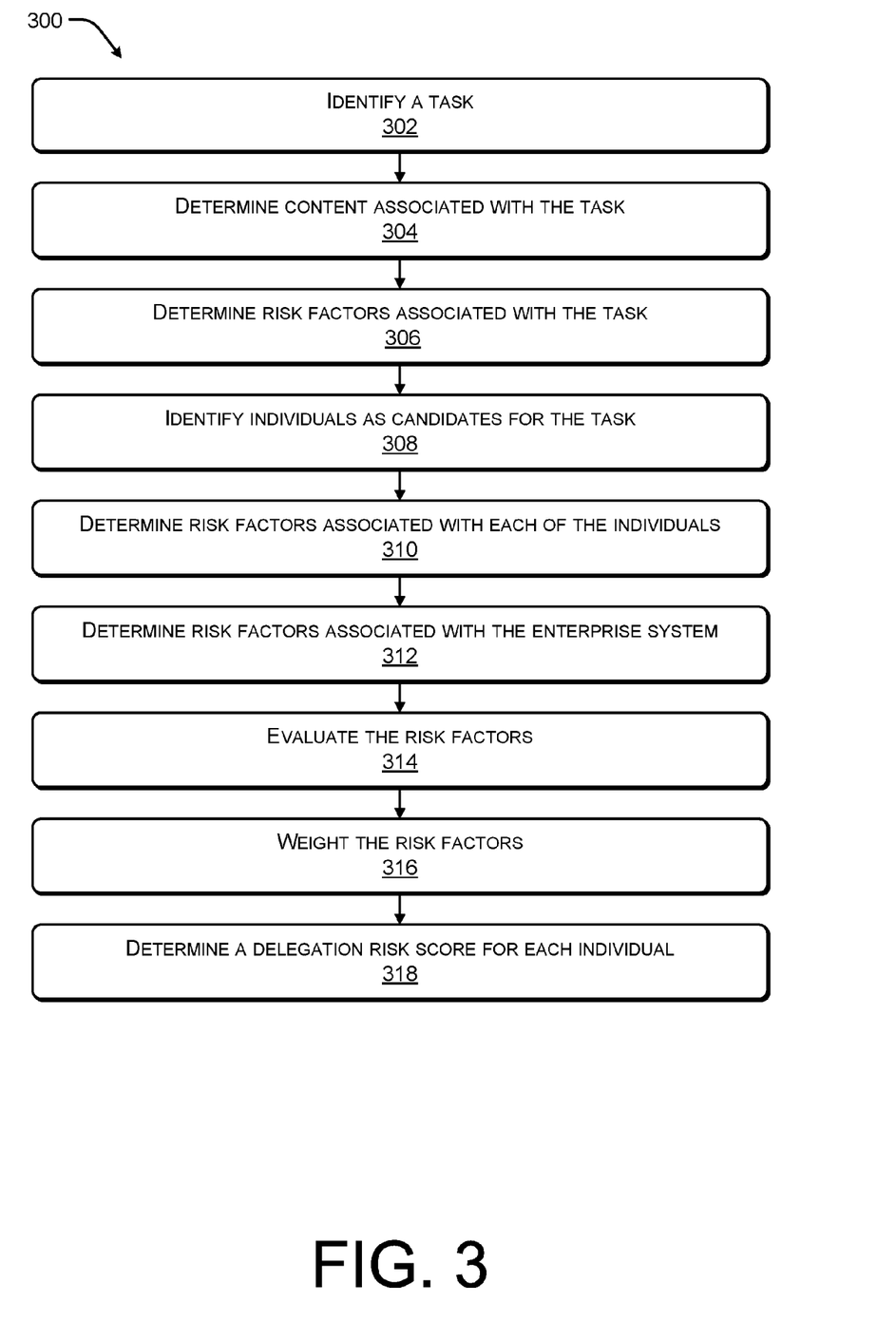
FIG. 3 is an example flow diagram showing an illustrative process to generate delegation scores
Figure 4:
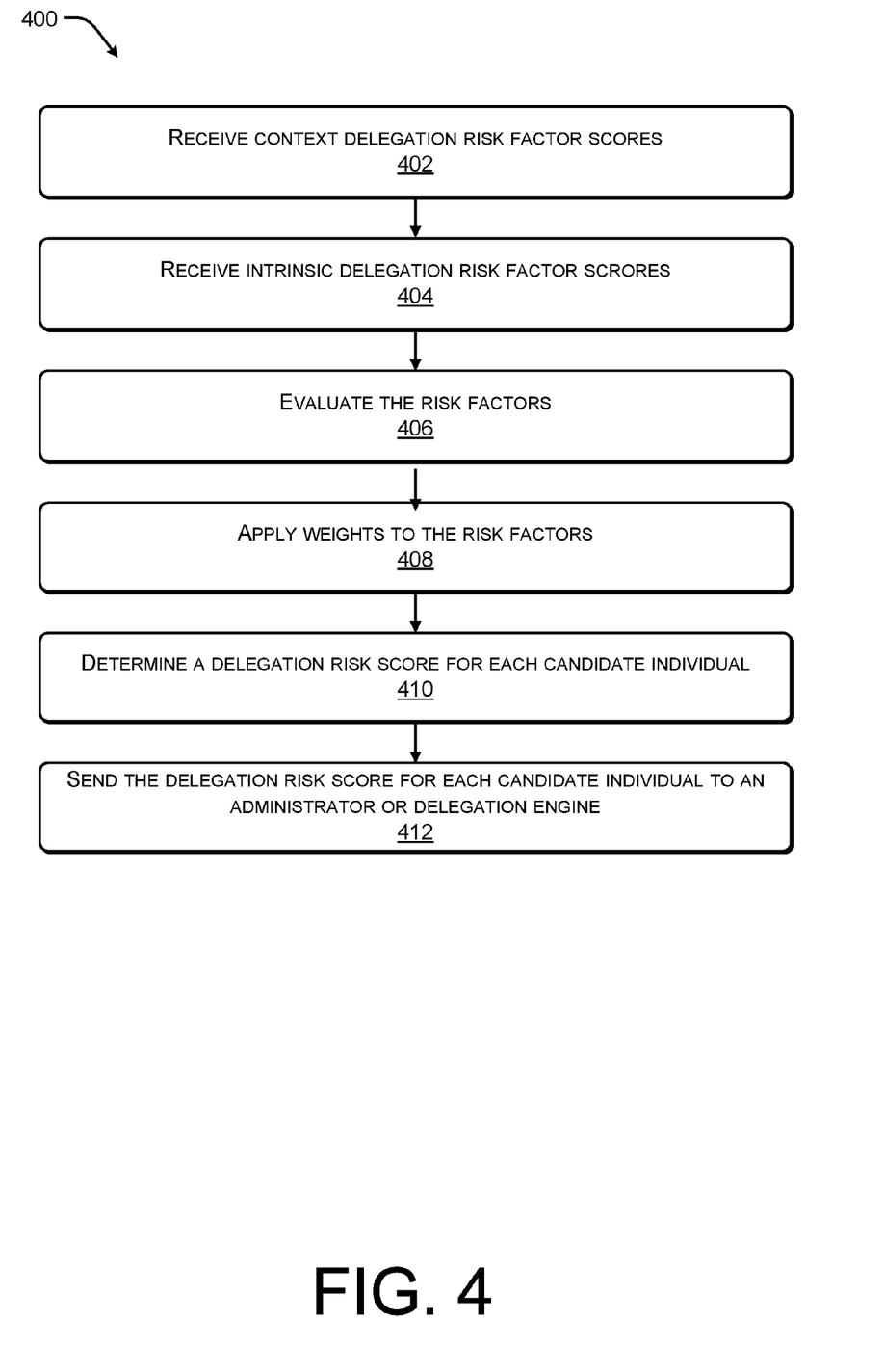
FIG. 4 is an example flow diagram showing an illustrative process 400 to generate delegation scores.

FIGS. 3 and 4 are flow diagrams illustrating example processes for implementing the delegation risk analysis system described herein. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 is an example flow diagram showing an illustrative process 300 to generate delegation scores. As discussed above, each individual with a particular job title or place within an organizational chart may have different delegation risks. In some cases, the delegation risk may be the risk of an individual within the organization exposing confidential information to an unauthorized person. By providing a delegation risk score, an administrator, manager, or delegation engine may assign tasks and permissions based on other criteria than job title, organization chart or group/team membership, as each individual regardless of title is different.

At 302, a delegation risk analysis system may identify a task to assign. For example, the tasks may be uploaded or entered into the delegation risk analysis system by an administrator or manager in the process of assigning the task. In some cases, the administrator or manager may outline or select key or relevant factors associated with the task, such as location, content, classification level, etc. In other cases, the delegation risk analysis system may access one or more database associated with an enterprise system to download or pull a list of tasks to be assigned to members of an organization.

At 304, the delegation risk analysis system may determine content associated with the task. For example, the content may be specified by the administrator or manager. In other examples, the delegation risk analysis system access one or more database associated with an enterprise system to download or pull a list of content associated with the task and/or a list of permission or individuals approve to access the content.

At 306, the delegation risk analysis system determines risk factors associated with the task. For example, the delegation risk analysis system may identify factors such as content permissions or classification, content location, location of individual already associated with the task, task or content business context, services or directories associated with the task, etc.

At 308, the delegation risk analysis system identifies individuals who may be candidates and/or are authorized for the task. For example, each individual within a team or group at an origination or each individual with a particular may be a candidate to perform the task.

At 310, the delegation risk analysis system determines risk factors associated with each of the candidate individuals. For example, the delegation risk analysis system may identify a trust profile for each candidate individual, past assignments, current assignments, and personal risk for each candidate individual, among others.

At 312, the delegation risk analysis system determines risk factors associated with the enterprise system. In one case, the delegation risk analysis system may identify factors common over a majority of enterprise system or specific to the enterprise system being used. For example, the factors may include read/write privileges, mailbox sharing settings, calendar viewing settings, site administration privileges, document or container access privileges, among others.

At 314, the delegation risk analysis system may evaluate the risk factors based on relevancy. For instance, given the context and information available about the task, the candidate individuals, and the enterprise system, the delegation risk analysis system may rank or group the factors based on relevancy. In one example, if a group of individuals will be assigned to the task the physical location of each individual may be more important than say factors associated with read/write privileges on a particular content item.

At 316, the delegation risk analysis system weights the factors. For example, the delegation risk analysis system may multiple a factor score associated with relevant factors by a value such as 1.1, 1.2, 1.3 etc. to increase the importance of the factors. Similarly, the delegation risk analysis system may multiple factors that are less relevant by a value such as 0.9, 0.8, 0.7 etc. to reduce the factors importance.

At 318, the delegation risk analysis system generates a delegation risk score for each candidate individual to perform each task. As discussed above, the delegation risk score may represents a risk that an unauthorized person may obtain access to confidential information associated with the task as a result of assigning the candidate individual. The delegation risk scores may then be utilized to at least in part assign the task to one of the candidate individuals.

FIG. 4 is an example flow diagram showing an illustrative process 400 to generate delegation scores. As discussed above, each individual with a particular job title or place within an organizational chart may have different delegation risks. In some cases, the delegation risk may be the risk of an individual within the organization exposing confidential information to an unauthorized person. By providing a delegation risk score, an administrator, manager, or delegation engine may assign tasks and permissions based on other criteria than job title, organization chart or group/team membership, as each individual regardless of title is different.

At 402, the delegation risk analysis system may receive a number of context risk factors relevant to the task being assigned. For example, the context risk factors may be factors associated with the candidate individuals, the task, or content associated with performing the task. In some cases, the context risk factors may include a trust profile or risk profile associated with the individual developed based at least in part on a history of past delegations and performance related thereto. In other cases, the factors may include a time-zone or physical location of each candidate individual, history of delegation, number of task delegated to each individual, recurring delegation, permissions associated with the content, among others.

At 404, the delegation risk analysis system may receive a number of intrinsic risk factors relevant to the task being assigned. For example, the intrinsic risk factors may be factors associated with the enterprise system. In some cases, the intrinsic risk factors may include mailbox sharing or calendar sharing settings or permissions, access rights, read/write access for content items or containers, administrative permissions or privileges, workflow approval, among others.

At 406, the delegation risk analysis system may evaluate the risk factors based on relevancy. For instance, given the context and information available about the task, the candidate individuals, and the enterprise system, the delegation risk analysis system may rank or group the factors based on relevancy. In one example, if a group of individuals will be assigned to the task the physical location of each individual may be more important than say factors associated with read/write privileges on a particular content item.

At 408, the delegation risk analysis system weights the factors. For example, the delegation risk analysis system may multiple a factor score associated with relevant factors by a value such as 1.1, 1.2, 1.3 etc. to increase the importance of the factors. Similarly, the delegation risk analysis system may multiple factors that are less relevant by a value such as 0.9, 0.8, 0.7 etc. to reduce the factors importance.

At 410, the delegation risk analysis system generates a delegation risk score for each candidate individual to perform each task. As discussed above, the delegation risk score may represents a risk that an unauthorized person may obtain access to confidential information associated with the task as a result of assigning the candidate individual.

At 412, The delegation risk analysis system may send the delegation risk scores for each candidate individual to an administrator or delegation engine. For example, an administrator or manger may be responsible for assigning the tasks in some cases, while in other cases the task may be assigned automatically by a delegation engine, as described above.

Figure 5:
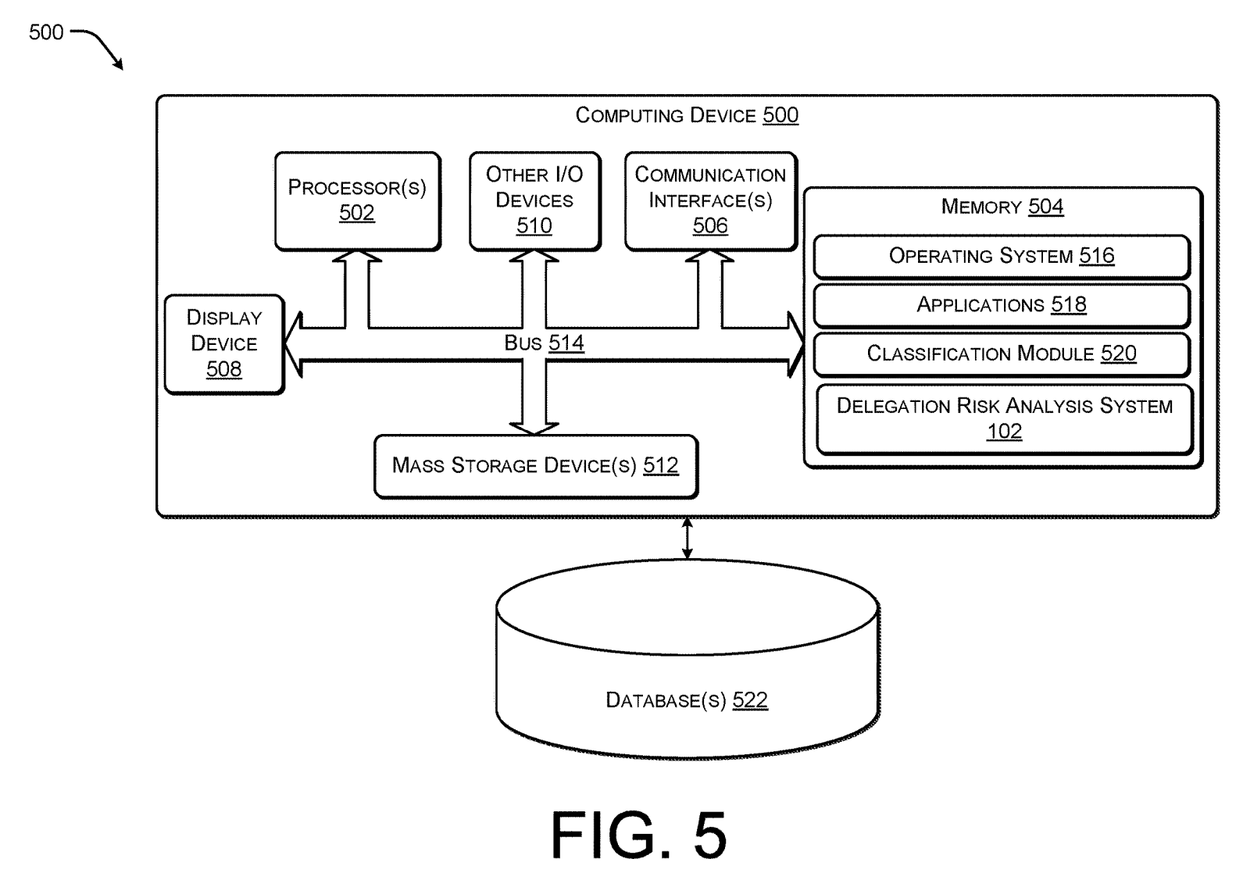
FIG. 5 illustrates an example configuration of a computing device 500 that can be used to implement the systems and techniques described herein.

FIG. 5 illustrates an example configuration of a computing device 500 that can be used to implement the systems and techniques described herein. The computing device 500 may include one or more processors 502, a memory 504, communication interfaces 506, a display device 508, other input/output (I/O) devices 510, and one or more mass storage devices 512, configured to communicate with each other, such as via a system bus 514 or other suitable connection. In some implementations, the computing device 500 may be representative of the classification component discussed above.

The processor 502 is a hardware device (e.g., an integrated circuit) that may include a single processing unit or a number of processing units, all or some of which may include single or multiple computing units or multiple cores. The processor 502 can be implemented as one or more microprocessors, microcomputers, microcontrollers, digital signal processors, central processing units, state machines, logic circuitries, and/or any devices that manipulate signals based on operational instructions. Among other capabilities, the processor 502 can be configured to fetch and execute computer-readable instructions stored in the memory 504, mass storage devices 512, or other computer-readable media.

Memory 804 and mass storage devices 512 are examples of computer storage media (e.g., memory storage devices) for storing instructions which are executed by the processor 502 to perform the various functions described above. For example, memory 504 may generally include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein, and may be a media capable of storing computer-readable, processor-executable program instructions as computer program code that can be executed by the processor 502 as a particular machine configured for carrying out the operations and functions described in the implementations herein.

The computing device 500 may also include one or more communication interfaces 506 for exchanging data with other devices of the system via a network. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 506 can also provide communication with external storage (not shown), such as in a storage array, network attached storage, storage area network, or the like.

A display device 508, such as a monitor may be included in some implementations for displaying information and images to users. Other I/O devices 510 may be devices that receive various inputs from a user and provide various outputs to the user, and may include a keyboard, a remote controller, a mouse, a printer, audio input/output devices, and so forth.

The computer storage media, such as memory 504 and mass storage devices 512, may be used to store software and data. For example, the computer storage media may be used to store an operating system 516 and one or more other applications 518. The computer storage media may also store one or more modules associated with delegation activities, generally illustrated as delegation risk analysis system 102. In some cases, the compunction interfaces 506 may allow the computing device 500 to receive data from one or more databases 522.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, and can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A computing device, comprising:
   a communication interface;
   one or more processors; and one or more computer-readable storage media storing computer-executable instructions, which when executed by one or more processors, cause the one or more processors to:

receive, via a user interface, a request to permit a user to perform a particular task;

receive, via the communication interface, first delegation risk factors associated with the particular task;

receive, via the communication interface, second delegation risk factors associated with a first candidate individual to perform the particular task;

receive, via the communication interface, third delegation risk factors associated with a second candidate individual to perform the particular task;

generate a first delegation risk score based at least in part on the first delegation risk factors and the second delegation risk factors, the first delegation risk score associated with the first candidate individual;

generate a second delegation risk score based at least in part on the first delegation risk factors and the third delegation risk factors, the second delegation risk score associated with the second candidate individual;

simultaneously provide, via the user interface, the first delegation risk score associated with the first candidate individual and the second delegation risk score associated with the second candidate individual; and receive, via the user interface, a selection of the first candidate individual to perform the particular task.

2. The computing device as recited in claim 1, wherein the computer-executable instructions, when executed by the one or more processors, further cause the one or more processors to:

send the first delegation risk score and the second delegation risk score to a delegation engine.

3. The computing device as recited in claim 1, wherein the computer-executable instructions, when executed by the one or more processors, further cause the one or more processors to:

send the first delegation risk score and the second delegation risk score to a location accessible to a system administrator.

4. The computing device as recited in claim 1, wherein the first delegation risk factors include delegation risk factors associated with content related to the task and delegation risk factors associated with at least one enterprise system related to the task.

5. The computing device as recited in claim 1, wherein the second delegation risk factors includes a first trust profile associated with the first candidate individual and the third delegation risk factors includes a second trust profile associated with the second candidate individual.

6. The computing device as recited in claim 1, wherein the computer-executable instructions, when executed by the one or more processors, further cause the one or more processors to:

assign the first candidate individual to perform the task based at least in part on the first delegation risk score, the second delegation risk score, and the selection of the first candidate individual.

7. The computing device as recited in claim 1, wherein generating a first delegation risk score further comprises:

determining a corresponding relevancy for individual ones of the first delegation risk factors and individual ones of the second delegation risk factors; and weighting the individual ones of the first delegation risk factors and individual ones of the second delegation risk factors based at least in part on the corresponding relevancy.

8. A computer-implemented method comprising:

receiving, by one or more processors, information associated with an unassigned task;

receiving, by the one or more processors, first delegation risk factors associated with a first candidate individual to perform the unassigned task;

receiving, by the one or more processors, second delegation risk factors associated with a second candidate individual to perform the unassigned task;

generating, by the one or more processors, a first delegation risk score based at least in part on the first delegation risk factors, the first delegation risk score associated with the first candidate individual;

generating, by the one or more processors, a second delegation risk score based at least in part on the second delegation risk factors, the second delegation risk score associated with the second candidate individual;

causing the first delegation risk score associated with the first candidate individual and the second delegation risk score associated with the second candidate individual to be provided simultaneously via a user interface; and receiving, via the user interface, a selection of the first candidate individual to perform the unassigned task.

9. The computer-implemented method as recited in claim 8, further comprising:

receiving, by the one or more processors, context delegation risk factors associated with the unassigned task;

receiving, by the one or more processors, intrinsic delegation risk factors associated with an enterprise system associated with the unassigned task; and wherein the first delegation risk score based at least in part on the context delegation risk scores and the intrinsic delegation risk scores and the second delegation risk score based at least in part on the context delegation risk scores and the intrinsic delegation risk scores.

10. The computer-implemented method as recited in claim 8, further comprising:

determining a corresponding relevancy for individual ones of the first delegation risk factors and individual ones of the second delegation risk factors; and weighting the individual ones of the first delegation risk factors and individual ones of the second delegation risk factors based at least in part on the corresponding relevancy.

11. The computer-implemented method as recited in claim 8, further comprising:

sending the first delegation risk score and the second delegation risk score to a delegation engine.

12. The computer-implemented method as recited in claim 8, further comprising:

sending the first delegation risk score and the second delegation risk score to a location accessible to a system administrator.

13. The computer-implemented method as recited in claim 8, further comprising:

assigning the first candidate individual to perform the task based at least in part on the first delegation risk score, the second delegation risk score, and the selection of the first candidate individual.

14. The computer-implemented method as recited in claim 8, further comprising:

receiving, by the one or more processors, third delegation risk factors associated with the first candidate individual;

receiving, by the one or more processors, fourth delegation risk factors associated with the second candidate individual;

updating, by the one or more processors, the first delegation risk score based at least in part on the third delegation risk factors; and updating, by the one or more processors, the second delegation risk score based at least in part on the fourth delegation risk factors.

15. The computer-implemented method as recited in claim 14, wherein:

the third delegation risk factors include an assignment of a second task to the first individual; and the fourth delegation risk factors include an assignment of a third task to the second individual.

16. A non-transitory computer-readable storage media storing computer-executable instructions, which when executed by one or more hardware processors, cause the one or more hardware processors to:

receive context delegation risk factors associated with a task;

receive intrinsic delegation risk factors associated with the task and one or more enterprise system associated with the task;

generate a first delegation risk score based at least in part on the context delegation risk factors and intrinsic delegation risk factors, the first delegation risk score associated with a first candidate individual to perform the task;

generate a second delegation risk score based at least in part on the context delegation risk factors and intrinsic delegation risk factors, the second delegation risk score associated with a second candidate individual to perform the task;

cause the first delegation risk score associated with the first candidate individual and the second delegation risk score associated with the second candidate individual to be provided simultaneously via a user interface; and receive, via the user interface, a selection of the first candidate individual to perform the task.

17. The non-transitory computer-readable storage media as recited in claim 16, wherein the instructions, when executed by the one or more hardware processors, further cause the one or more hardware processors to send the first delegation risk score and the second delegation risk score to a location accessible to a system administrator.

18. The non-transitory computer-readable storage media as recited in claim 16, wherein the instructions, when executed by the one or more hardware processors, further cause the one or more hardware processors to send the first delegation risk score and the second delegation risk score to a delegation engine.

19. The non-transitory computer-readable storage media as recited in claim 16, wherein the instructions, when executed by the one or more hardware processors, further cause the one or more hardware processors to assign the first candidate individual to perform the task based at least in part on the first delegation risk score, the second delegation risk score, and the selection of the first candidate individual.

20. The non-transitory computer-readable storage media as recited in claim 16, wherein the instructions, when executed by the one or more hardware processors, further cause the one or more hardware processors to:

determine a corresponding relevancy for individual ones of the context delegation risk factors and individual ones of the intrinsic delegation risk factors; and weight the individual ones of the context delegation risk factors and individual ones of the intrinsic delegation risk factors based at least in part on the corresponding relevancy.

\* \* \* \* \*